United States Patent [19]

Kurita et al.

[11] Patent Number: 4,581,138
[45] Date of Patent: Apr. 8, 1986

[54] FILTER PRESS

[75] Inventors: Tetsuya Kurita, Takarazuka; Seiichi Suwa, Yao, both of Japan

[73] Assignee: Kurita Machinery Manufacturing Company Limited, Osaka, Japan

[21] Appl. No.: 625,538

[22] Filed: Jun. 28, 1984

[30] Foreign Application Priority Data

Aug. 31, 1983 [JP] Japan .................................. 58-159644

[51] Int. Cl.⁴ .............................................. B01D 25/34
[52] U.S. Cl. .................................... 210/225; 100/198; 210/227; 210/230; 210/236
[58] Field of Search ................................ 210/224–231, 210/236; 100/112, 198

[56] References Cited

U.S. PATENT DOCUMENTS

3,117,083 1/1964 Przhilensky ........................... 210/225
3,270,887 9/1966 Juhasz et al. ......................... 210/225
3,767,052 10/1973 Shibasaki .............................. 210/225
3,807,567 4/1974 Iwatani ................................. 210/225
4,108,777 8/1978 Kurita et al. ......................... 210/225
4,446,020 5/1984 Kurita .................................. 210/225

Primary Examiner—Richard V. Fisher
Assistant Examiner—W. Gary Jones
Attorney, Agent, or Firm—Wenderoth, Lind & Ponack

[57] ABSTRACT

A filter press including a plurality of filter plates, a pair of filter cloths disposed at opposite faces of each of the filter plates, a wind-up device for winding up the pair of the filter cloths, a guide member having a pair of curved guide surfaces formed at its opposite side edges, respectively and a pair of guide rollers. The pair of the filter cloths are guided downwardly by the guide member and the pair of the guide rollers so as to be wound up by the wind-up device such that the pair of the filter cloths are bent inwardly toward each other at the pair of the curved guide surfaces of the guide member, respectively.

11 Claims, 16 Drawing Figures

FILTER PRESS

BACKGROUND OF THE INVENTION

The present invention generally relates to filter presses including a plurality of ordinary filter plates or pressing filter plates (hereinbelow referred to as "filter plates") and a plurality of filter cloths interposed in pairs between adjacent ones of the filter plates, in which slurry to be filtered is filtered or filtered under pressure into filtrate and filter residue, and more particularly, to a filter cloth travelling type filter press equipped with a filter residue separating device for separating the filter residue from the filter cloths.

Conventionally, in filter cloth travelling type filter presses, in order to separate, at the time of retraction of filter plates away from one another after completion of filtration of slurry to be filtered, from filter cloths filter residue adhering thereto, it has been so arranged that filter residue separating members such as scrapers, etc. are, respectively, brought into contact with curved surfaces of the filter cloths running along wind-up rollers for winding up the filter cloths or along guide rollers for guiding the filter cloths to the wind-up rollers so as to scrape the filter residue off the filter cloths.

However, the prior art filter presses have such an inconvenience that, since the scrapers, etc. are arranged to be inserted between the filter residue and the filter cloths so as to rub the surfaces of the filter cloths upon travelling of the filter cloths, when the filter residue is separated from the filter cloths by the scrapers, etc., the surfaces of the filter cloths are likely to be damaged by the scrapers, etc., thus resulting in a shorter service life of the filter cloths.

SUMMARY OF THE INVENTION

Accordingly, an essential object of the present invention is to provide an improved filter press in which filter residue adhering to filter cloths is smoothly separated from the filter cloths without any damage to the filter cloths, with substantial elimination of the disadvantages inherent in conventional filter presses of this kind.

Another important object of the present invention is to provide an improved filter press of the above described type which is simple in structure, highly reliable in actual use and suitable for mass production at low cost.

In accomplishing these and other objects according to one preferred embodiment of the present invention, there is provided an improved filter press including a plurality of filter plates, a pair of first and second filter cloths disposed at opposite faces of each of said filter plates, respectively and a wind-up device for winding up the pair of said first and second filter cloths, said wind-up device being disposed below each of said filter plates, said filter press comprising: an elongated guide member for guiding the pair of said first and second filter cloths, which is disposed between each of said filter plates and said wind-up device so as to extend in the widthwise direction of each of said filter plates and has a pair of first and second curved guide surfaces formed on opposite side edges thereof, respectively such that said first and second curved guide surfaces confront said first and second filter cloths, respectively, with the width of said guide member being defined by said opposite side edges of said guide member; and a pair of first and second guide rollers which are disposed below and adjacent to said guide member so as to extend, in parallel with each other, in said widthwise direction of each of said filter plates; said first and second guide rollers being spaced a predetermined clearance from each other, which predetermined clearance is smaller than said width of said guide member, whereby the pair of said first and second filter cloths are guided downwardly from each of said filter plates through contact of said first and second filter cloths with said first and second curved guide surfaces of said guide member, respectively and subsequently, through contact of said first and second filter cloths with opposed inside portions of peripheries of said first and second guide rollers, respectively so as to be wound up by said wind-up device such that said first and second filter cloths are, respectively, bent inwardly toward each other at said first and second curved guide surfaces of said guide member.

In accordance with the present invention, the pair of the first and second filter cloths travelling in first and second initial travelling directions prior to reaching the first and second curved guide surfaces of the guide member, respectively are bent inwardly toward each other at the curved guide surfaces of the guide member through contact of the first and second filter cloths with the first and second curved guide surfaces of the guide member, respectively and subsequently, through contact of the first and second filter cloths with the first and second guide rollers, respectively, and the filter residue adhering to the first filter cloth and the filter residue adhering to the second filter cloth is caused to proceed in the first and second initial travelling directions of the first and second filter cloths by their respective inertia forces without being bent together with the first and second filter cloths at the first and second curved guide surfaces of the guide member, respectively. Accordingly, since a clearance is formed, at each of the first and second curved guide surfaces of the guide member, between each of the first and second filter cloths and the filter residue adhering thereto such that the filter residue is separated from each of the first and second filter cloths, the drawback inherent in the known filter presses that the filter cloths are demaged by edges of the scrapers can be eliminated.

Furthermore, in accordance with the present invention, since the pair of the first and second filter cloths disposed at the front and rear faces of each of the filter plates, respectively are bent by the single guide member such that the filter residue is separated from the first and second filter cloths, the filter press has been made simple in structure and can be manufactured at low cost in comparison with the prior art filter presses including the scrapers provided for each of the filter cloths, while assembly and disassembly operations for the guide member can be performed with much ease.

BRIEF DESCRIPTION OF THE DRAWINGS

These and other objects and features of the present invention will become apparent from the following description of a preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
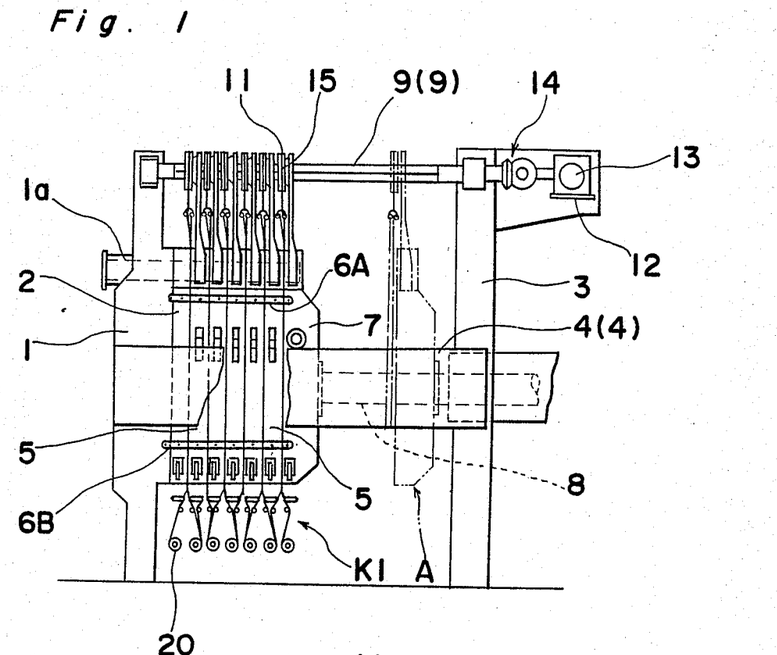
FIG. 1 is a schematic side elevational view of a filter press according to a first embodiment of the present invention.
Figure 2:
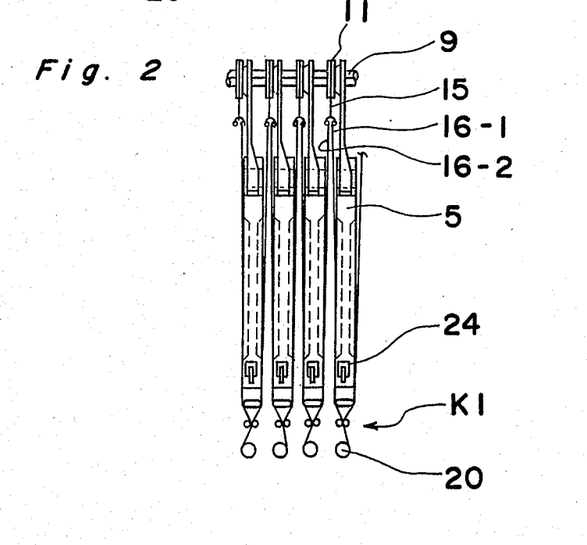
FIG. 2 is a fragmentary side elevational view of the filter press of FIG. 1 at the time of opening of the press to separate the filter plates employed therein.
Figure 3:
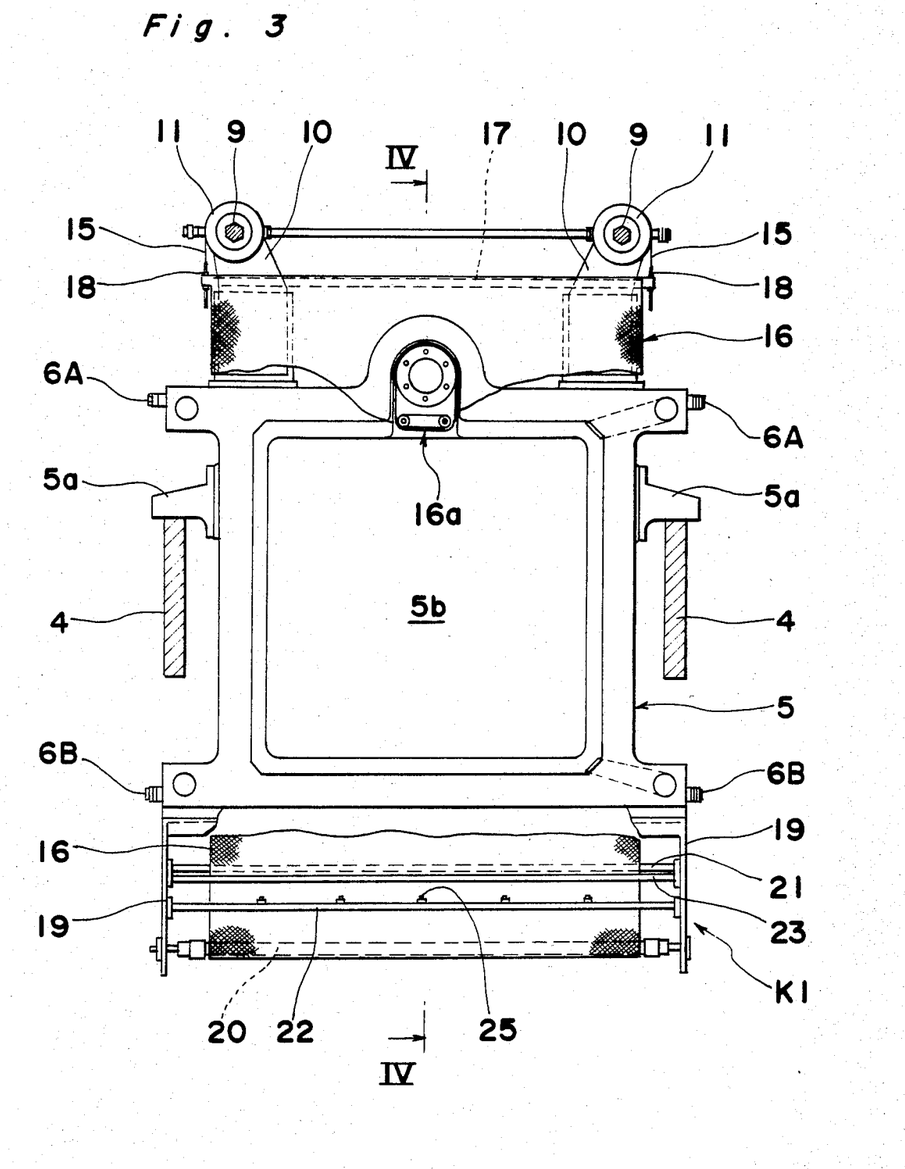
FIG. 3 is a transverse sectional view, partly broken away, particularly showing one plate of the filter press of FIG. 1.

Referring now to the drawings, there is shown in FIGS. 1 to 7, a filter press K1 according to a first embodiment of the present invention. As best shown in FIGS. 1 and 3, the filter press K1 generally includes a front stand 1, a main plate 2 supported by the front stand 1, a rear stand 3, a pair of side beams 4 extending between and mounted on opposite sides of the front stand 1 and the rear stand 3, respectively, a plurality of filter plates 5 each having a pair of lugs 5a formed at opposite sides thereof, a pair of upper coupling links 6A attached to upper opposite sides of the filter plates 5, a pair of lower coupling links 6B attached to lower opposite sides of the filter plates 5, a movable plate 7 driven forwardly and rearwardly by a driving piston 8 secured to the rear stand 3, and a plurality of filter cloths 16 each including a pair of filter cloth portions 16-1 and 16-2 interposed between adjacent ones of the filter plates 5. The filter plates 5 are coupled to each other by the pair of the upper coupling links 6A and the pair of the lower coupling links 6B and the pair of the lugs 5a of each of the filter plates 5 are, respectively, slidably placed on the pair of the side beams 4 such that the filter plates 5 can be moved forwardly and rearwardly. It is so arranged that the filter plates 5 are simultaneously retracted away from each other at intervals of a predetermined distance defined by the upper and lower coupling links 6A and 6B when the movable plate 7 has been driven rearwardly by the driving piston 8 to the retracted position A shown in the imaginary lines in FIG. 1.

The filter press K1 further includes a pair of driving shafts 9 of polygonal cross section extending between and mounted on upper opposite sides of the front stand 1 and the rear stand 3, a pair of support members 10 mounted on opposite side portions of a top face of each of the filter plates 5, a pair of wind-up pulleys 11 rotatably supported by the pair of the support members 10, respectively and having the pair of the driving shafts 9 fitted thereinto, respectively, a stand 12 secured to an upper portion of the rear stand 3, a motor 13 provided with a speed reducer and mounted on the stand 12, and a bevel gear transmission mechanism 14. It is so arranged that the pair of the driving shafts 9 are rotated forwardly and reversely through the bevel gear transmission mechanism 14 upon forward and reverse rotation of the motor 13.

Furthermore, a pair of cords 15 are, respectively, wound around the pair of the wind-up pulleys 11 and each of the cords 15 has one end attached to each of the wind-up pulleys 11 and the other end attached to a coupling 18 secured to one end of a support rod 17 from which each of the filter cloths 16 is hung for supporting thereof.

Meanwhile, a pair of brackets 19 are, respectively, mounted on opposite side portions of a bottom face of each of the filter plates 5 so as to extend downwardly. An elongated guide member 21 of substantially rectangular cross section, a pair of guide rollers 23 and a wind-up roller 20 acting as a filter cloth wind-up device are supported between the pair of the brackets 19. The pair of the guide rollers 23 are disposed below the guide member 21, while the wind-up roller 20 is disposed below the pair of the guide rollers 23 such that the pair of the guide rollers 23 are disposed between the guide member 21 and the wind-up roller 20. The guide member 21 has opposite ends secured to the pair of the brackets 19, respectively and a pair of curved guide surfaces 21a formed on opposite side edges thereof, respectively. The guide member 21 has a length larger than a width of each of the filter cloths 16. Furthermore, the width D (FIG. 7) of the guide member 21, which extends in the direction of the thickness of each of the filter plates 5, is made slightly smaller than the thickness of each of the filter plates 5 such that adjacent guide members 21 are not brought into contact with each other at the time of clamping of the filter plates 5 to one another.

Figure 5:
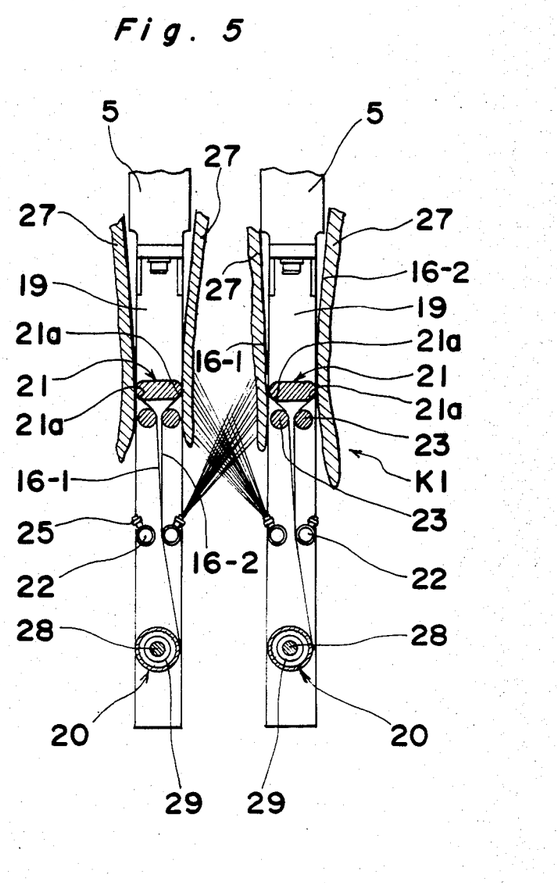
FIG. 5 is a view similar to FIG. 2, particularly showing, on an enlarged scale, a filter residue separating device and a filter cloth wind-up device employed in the filter press of FIG. 1.
Figure 7:
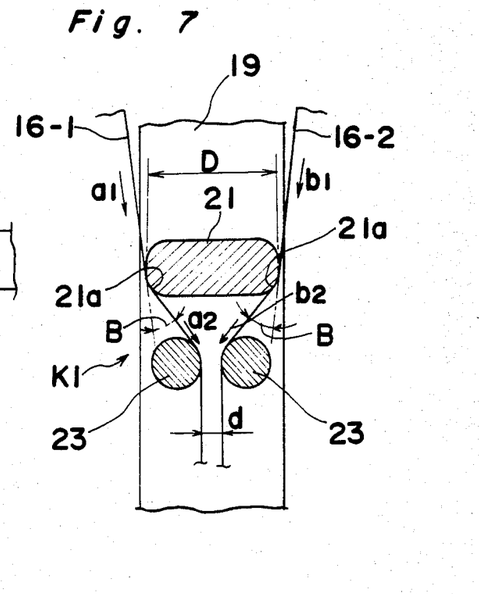
FIG. 7 is an enlarged detail view showing one portion of the filter residue separating device of FIG. 5.

Moreover, the pair of the guide rollers 23 are so provided as to extend, in parallel with each other, in the widthwise direction of each of the filter cloths 16 and are spaced a predetermined clearance d from each other such that the predtermined clearance d is smaller than the width D of the guide member 21 as shown in FIG. 7. The pair of the filter cloth portions 16-1 and 16-2 disposed at the front and rear faces of each of the filter plates 5 are guided downardly from each of the filter plates 5 through contact of th filter cloth portions 16-1 and 16-2 with the curved guide surfaces 21a of the guide member 21, respectively and subsequently, through contact of the filter cloth portions 16-1 and 16-2 with opposed inside portions of peripheries of the pair of the guide rollers 23, respectively so as to be wound up by the wind-up roller 20 such that the filter cloth portions 16-1 and 16-2 are, respectively, bent inwardly toward each other at the curved guide surfaces 21a of the guide member 21. More specifically, as best shown in FIGS. 5 and 7, the filter cloth portions 16-1 and 16-2 travelling in initial travelling directions a1 and b1 prior to reaching the pair of the curved guide surfaces 21a of the guide member 21, respectively are bent inwardly toward each other at the curved guide surfaces 21a so as to be directed in guide directions a2 and b2, respectively. Meanwhile, filter residue 27 adhering to the filter cloth portion 16-1 and filter residue 27 adhering to the filter cloth portion 16-2 are caused to proceed in the initial travelling directions a1 and b1 of the filter cloth portions 16-1 and 16-2 by their respective inertia forces without being bent together with the filter cloth portions 16-1 and 16-2 at the curved guide surfaces 21a of the guide member 21, respectively. Accordingly, a clearance is formed, at each of the curved guide surfaces 21a of the guide member 21, between each of the filter cloth portions 16-1 and 16-2 and the filter residue 27 adhering thereto such that the filter residue 27 is separated from each of the filter cloth portions 16-1 and 16-2. It should be noted here that it is desirable that the bending angle B formed between each of the initial travelling directions a1 and b1 of the filter cloth portions 16-1 and 16-2 and each of the guide directions a2 and b2 of the filter cloth portions 16-1 and 16-2 be set to at least 75° approximately.

Figure 4:
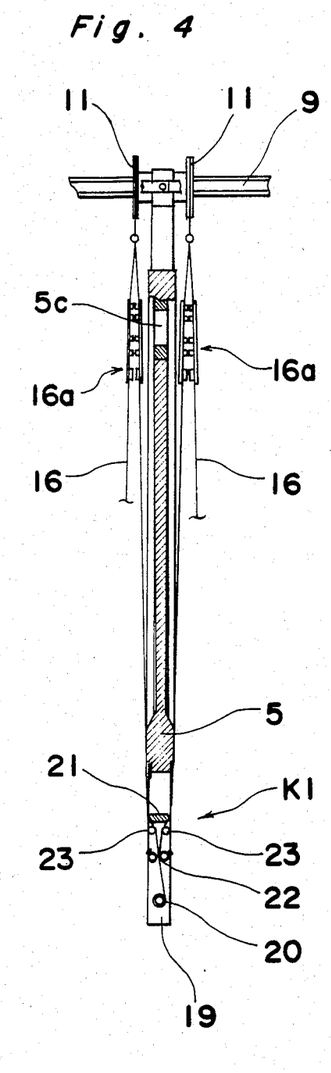
FIG. 4 is a cross-sectional view taken along the line IV—IV in FIG. 3.
Figure 6:
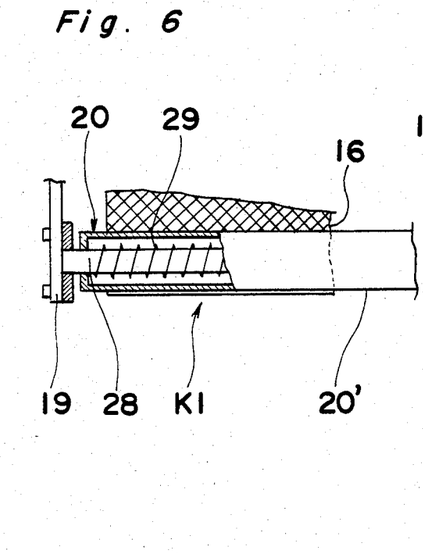
FIG. 6 is a fragmentary cross-sectional view of the filter cloth wind-up device of FIG. 5.

As shown in FIGS. 3 and 4, the pair of the filter cloth portions 16-1 and 16-2, which cover a pair of filtration areas 5b formed on the front and rear faces of each of the filter plates 5, respectively, are secured, at the lower ends thereof, to the wind-up roller 20. As shown in FIG. 6, the wind-up roller 20 includes a support shaft 28 fixedly secured between the pair of the brackets 19, a cylindrical hollow roller body 20' rotatably supported, at opposite ends thereof, by the support shaft 28, and a coiled torsion spring 29 wound around the support shaft 28 and disposed in the roller body 20'. The coiled torsion spring 29 is attached, at opposite ends thereof, to the roller body 20' and is secured, at a central portion thereof, to the support shaft 28 so as to at all times urge the wind-up roller 20 in a wind-up direction for winding up the filter cloth portions 16-1 and 16-2. It can be also so arranged that a coiled torsion spring (not shown) is provided between one end of a wind-up roller (not shown) rotatably supported, at opposite ends thereof, by the pair of the brackets 19 and one of the brackets 19 so as to be secured, at opposite ends thereof, to the one of the brackets 19 and the one end of the wind-up roller such that the wind-up roller is at all times urged by the coiled torsion spring in the wind-up direction for winding up the filter cloth portions 16-1 and 16-2. As described above, the pair of the filter cloth portions 16-1 and 16-2 are bent inwardly toward each other in the direction of the thickness of each of the filter plates 5 by the guide member 21 and the pair of the guide rollers 23 from a state where the filter cloth portions 16-1 and 16-2 are properly stretched from the upper end of each of the filter cloths 16 to the guide member 21 by the urging force of the coiled torsion spring 29.

Furthermore, a pair of washing pipes 22 are secured between the pair of the brackets 19 so as to be disposed between the pair of the guide rollers 23 and the wind-up roller 20. A number of washing nozzles 25 confronting each of the filter cloth portions 16-1 and 16-2 are provided on each of the washing pipes 22 so as to separate the filter residue 27 from each of the filter cloth portions 16-1 and 16-2 and wash each of the filter cloth portions 16-1 and 16-2.

In the case where the filter plates 5 are clamped to each other in close vicinity to the front stand 1 upon forward movement of the movable plate 7 as shown in the solid lines in FIG. 1, slurry to be filtered is fed under pressure, through a slurry feed opening 5c (FIG. 4) of each of the filter plates 5 and a slurry feeding member 16a attached to each of the pair of the filter cloth portions 16-1 and 16-2, between the pair of the filter cloth portions 16-1 and 16-2 from a slurry feed pipe 1a secured to the front stand 1 so as to be separated into the filter residue 27 and filtrate such that the separated filtrate is collected by a filtrate collecting pipe 24, whereby filtration of the slurry has been performed.

When the movable plate 7 has been driven rearwardly to the retracted position A shown by the imaginary lines in FIG. 1 after completion of one cycle of the filtration process, the filter plates 5 coupled to each other sequentially from the movable plate 7 by the upper and lower coupling links 6A and 6B are simultaneously retracted away from each other at intervals of the predetermined distance as shown in FIG. 2. Simultaneously with retraction of the filter plate 5 away from each other, a portion of the separated filter residue 27 drops as a filter cake by its own weight. At this time, the pair of the filter cloth portions 16-1 and 16-2 are stretched so as to be slightly spaced from each of the filter plates 5. Subsequently, when the motor 13 is driven in a rewinding direction for rewinding the filter cloth portions 16-1 and 16-2 through the speed reduction means of the motor, the pair of the cords 15 wound around the pair of the wind-up pulleys 11 are, respectively, unwound by the pair of the driving shafts 9, so that the wind-up roller 20 is rotated in the wind-up direction by the large urging force of the coiled torsion spring 29 held in a maximum torsional state. Thus, upon the wind-up rotation of the wind-up roller 20, the pair of the filter cloth portions 16-1 and 16-2 disposed at the front and rear faces of each of the filter plates 5, respectively are caused to travel as follows.

Namely, the front filter cloth portion 16-1 is caused to change its travelling direction rearwardly through its contact with the front curved guide surface 21a of the guide member 21 and subsequently, through its contact with the inside portion of the periphery of the front guide roller 23. On the other hand, the rear filter cloth portion 16-2 is caused to change its travelling direction forwardly through its contact with the rear curved guide surface 21a of the guide member 21 and subsequently, through its contact with the inside portion of the periphery of the rear guide roller 23. Consequently, a clearance is formed, at each of the curved guide surfaces 21a for changing the travelling directions of the filter cloth portions 16-1 and 16-2, respectively, between each of the filter cloth portions 16-1 and 16-2 and the filter residue 27 adhering thereto such that the filter residue 27 is separated from each of the filter cloth portions 16-1 and 16-2. Then, the filter cloth portions 16-1 and 16-2 are wound up by the wind-up roller 20. Meanwhile, the filter residue 27, which has been separated from each of the filter cloth portions 16-1 and 16-2, drops downwardly by its own weight so as to be collected.

Hereinbelow, a process for separating the filter residue 27 from the filter cloth portions 16-1 and 16-2 by merely changing the travelling directions of the filter cloth portions 16-1 and 16-2 will be described. Namely, the filter residue 27 is retained by the filter cloth portions 16-1 and 16-2 through a filtering pressure or a clamping pressure of the filter plates 5 and a great portion of the filter residue 27 drops by its own weight when the above described pressure is eliminated at the time of retraction of the filter plates 5 away from each other. However, at this time, a portion of the filter residue 27 remains at the filter cloth portions 16-1 and 16-2 not because the filter residue 27 is bonded to the filter cloth portions 16-1 and 16-2 by a large adhesive force but because the filter residue 27 is caught in the meshes of the filter cloth portions 16-1 and 16-2, for example. Accordingly, when the filter cloth portions 16-1 and 16-2 having the filter residue remaining thereat are caused to change the travelling directions, the filter residue 27 is not capable of being bent together with the filter cloth portions 16-1 and 16-2 and further, is subjected to inertia forces produced by travelling of the filter cloth portions 16-1 and 16-2, so that the filter residue 27 is subjected, at the time of bending of the filter cloth portions 16-1 and 16-2, to the inertia forces directed in the initial travelling directions a1 and b1 of the filter cloth portions 16-1 and 16-2 and thus, a clearance is formed between each of the filter cloth portions 16-1 and 16-2 and the filter residue 27 adhering thereto, whereby the filter residue 27 is separated from each of the filter cloth portions 16-1 and 16-2.

In accordance with the present invention, since it becomes possible to smoothly separate the filter residue 27 from the filter cloth portions 16-1 and 16-2 by merely bringing the pair of the filter cloth portions 16-1 and 16-2 into contact with the pair of the curved guide surfaces 21a of the guide member 21 and the pair of the guide rollers 23, respectively in comparison with prior art filter presses in which an edge of a scraper is inserted between each of the filter cloth portions 16-1 and 16-2 and the filter residue 27 adhering thereto so as to be brought into contact with each of the filter cloth portions 16-1 and 16-2 such that the filter residue 27 is separated from each of the filter cloth portions 16-1 and 16-2, the filter cloth portions 16-1 and 16-2 are prevented from being damaged.

Furthermore, in accordance with the present invention, since the filter residue 27 adhering to the filter cloth portion 16-1 and the filter residue 27 adhering to the filter cloth portion 16-2 can be, respectively, separated therefrom by the single guide member 21, the filter press K1 has been made simple in structure and can be manufactured at low cost in comparison with the prior art filter presses including scrapers provided for each of the filter cloth portions 16-1 and 16-2, while assembly and disassembly operations for the guide member 21 can be performed with much ease.

Moreover, in accordance with the present invention, since the pair of the filter cloth portions 16-1 and 16-2 are bent through contact of the filter cloth portions 16-1 and 16-2 with the pair of the curved guide surfaces 21a of the guide member 21, respectively, the inconvenience associated with a filter press including rollers for bending the filter cloths 16 that the rollers subjected to a rotational inertia force due to travelling of each of the filter cloths 16 feed each of the filter cloths 16 faster than a predetermined travelling speed of each of the filter cloths 16 so as to vibrate each of the filter cloths 16 to such a large extent that travelling of each of the filter cloths 16 becomes unstable, is eliminated.

Referring now to FIGS. 8 to 12, there are shown filter residue separating devices employed in filter presses K1(1), K1(2), K1(3), K1(4) and K1(5) which are first, second, third, fourth and fifth modifications of the filter press K1, respectively.

Figure 8:
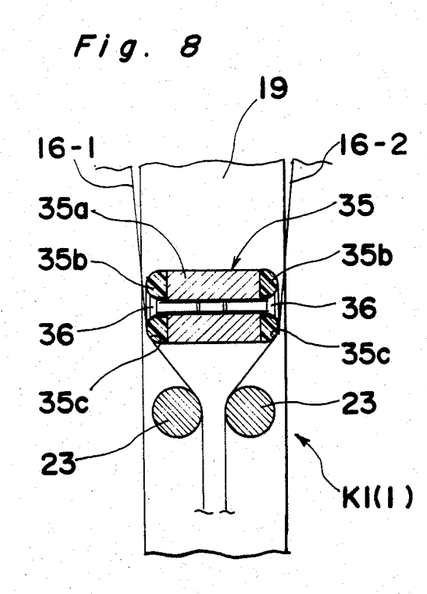
FIGS. 8, 9, 10, 11 and 12 are views similar to FIG. 7, particularly showing first, second, third, fourth and fifth modifications thereof, respectively.
Figure 9:
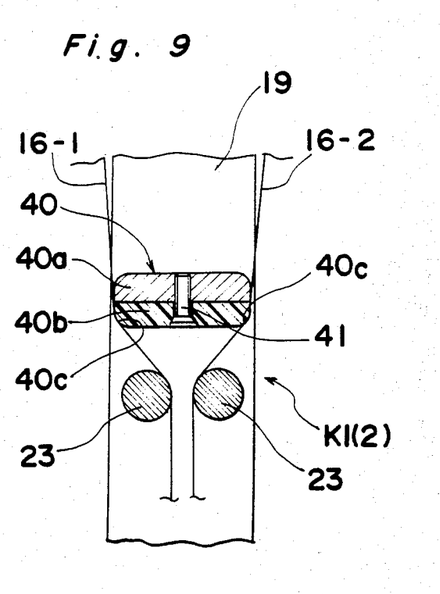

As shown in FIG. 8, the first modified filter press K1(1) includes a guide member 35 in place of the guide member 21 of the filter press K1. The guide member 35 includes a guide member body 35a and a pair of members 35b having a pair of curved guide surfaces 35c, respectively and made of, for example, plastics. The pair of the members 35b are attached to opposite side faces of the guide member body 35a by a pair of screws 36, respectively. Thus, when one of the curved guide surfaces 35c of the members 35b is subjected to wear, damage, etc. due to travelling of the filter cloths 16, the defective guide member 35 can be repaired with much ease by merely replacing the defective member 35b.

In the same manner as described in the first modified filter press K1(1), the second modified filter press K1(2) (FIG. 9) includes a guide member 40. The guide member 40 includes a guide member body 40a and a member 40b having a pair of curved guide surfaces 40c and made of, for example, plastics and the member 40b is attached to the bottom face of the guide member body 40a by a screw 41. Thus, when the curved guide surfaces 40c of the member 40b are subjected to wear, damage, etc. due to travelling of the filter cloths 16, the defective guide member 40 can be repaired with much ease by merely replacing the defective member 40b.

Figure 10:
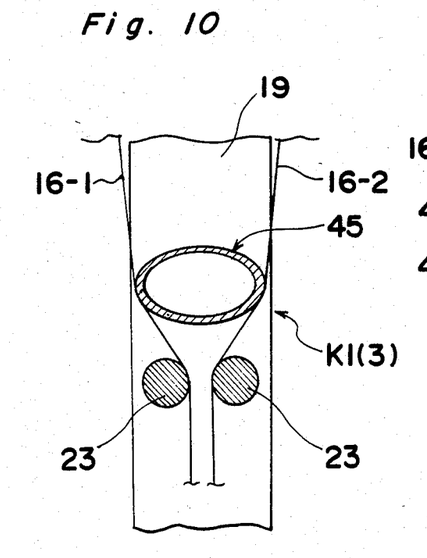
Figure 11:
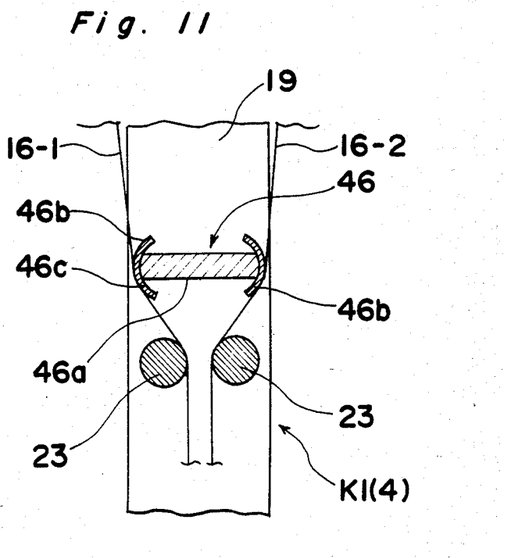

As shown in FIG. 10, the third modified filter press K1(3) includes a guide member 45. The guide member 45 is made of a tube of elliptic cross section so as to decrease its weight.

The fourth modified filter press K1(4) (FIG. 11) includes a guide member 46. The guide member 46 includes a guide member body 46a of substantially rectangular cross section and a pair of curved pieces 46b having a pair of curved guide surfaces 46c, respectively and attached to opposite side faces of the guide member body 46a.

Figure 12:
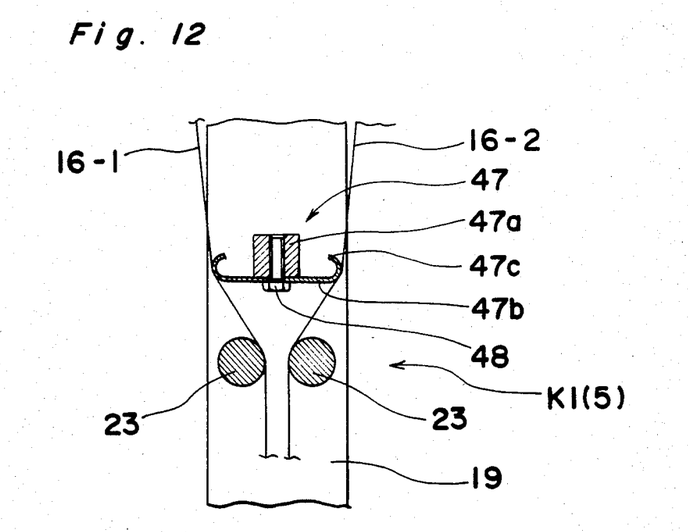

Furthermore, as shown in FIG. 12, the fifth modified filter press K1(5) includes a support member 47a and a metal sheet member 47b having a pair of curved guide surfaces 47c formed at opposite side portions thereof. The metal sheet member 47b is attached, at a central portion thereof, to the support member 47a by a bolt 48, while the support member 47a is secured to the pair of the brackets 19 such that the opposite side portions of the metal sheet member 47b are elastically bent in the travelling direction of the filter cloth portions 16-1 and 16-2, respectively. By the above described arrangement of the filter press K1(5), an impact force, etc. applied to the filter cloths 16 at the time of travelling of the filter cloths 16 can be absorbed through deflection of the opposite side portions of the metal sheet member 47b. The support member 47a can be supported by a spring, etc. so as to be slightly pivotally movable relative to the pair of the brackets 19 and to be returned to its original position, whereby the impact force, etc. applied to the filter cloths 16 can be absorbed more effectively.

Moreover, it can be also so arranged that a film of urethane resin, polytetrafluoroethylne (PTFE) resin, etc. is coated on each of the pair of the curved guide surfaces of the guide member such that the filter cloths can travel more smoothly along the curved guide surfaces.

Figure 13:
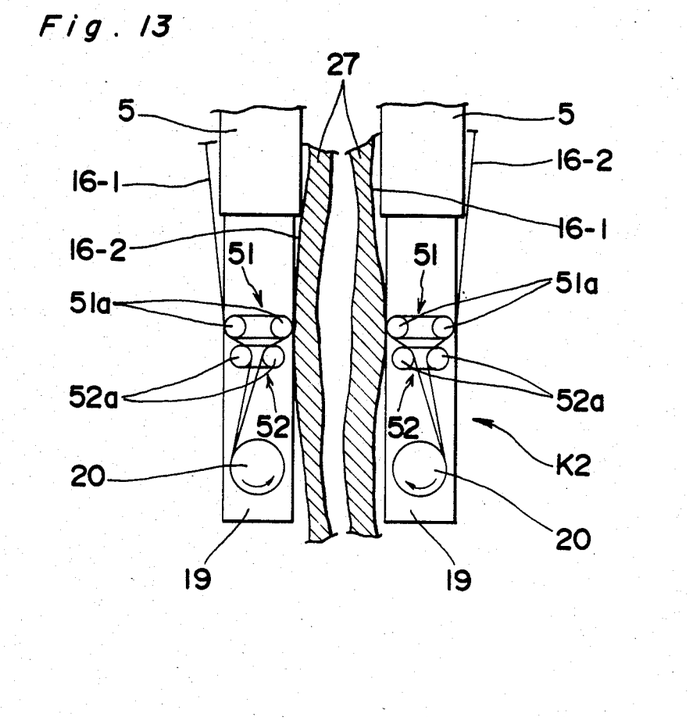
FIG. 13 is a view similar to FIG. 5, particularly showing a filter residue separating device employed in a filter press according to a second embodiment of the present invention.
Figure 14:
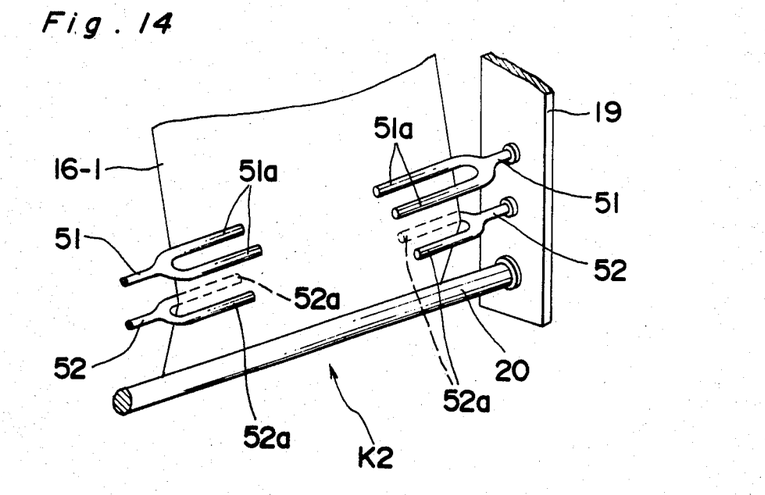
FIG. 14 is a partially broken away perspective view of the filter residue separating device of Frg. 13.

Referring to FIGS. 13 and 14, there is shown a filter residue separating device employed in a filter press K2 according to a second embodiment of the present invention. The filter press K2 includes a pair of first guide members 51 and a pair of second guide members 52. Each of the first guide members 51 is of a forked shape and is formed with a pair of first guide rollers 51a. Meanwhile, each of the second guide members 52 is also of a forked shape and is formed with a pair of second guide rollers 52a. The pair of the first guide members 51 are, respectively, mounted on the pair of the brackets 19 such that the pair of the first guide rollers 51a of one of the first guide members 51 mounted on one of the brackets 19 are spaced from and confront the pair of the first guide rollers 51a of the other one of the first guide members 51 mounted on the other one of the brackets 19. Likewise, the pair of the second guide members 51 are, respectively, mounted on the pair of the brackets 19 so as to be disposed below the first guide members 51, respectively such that the pair of the second guide rollers 52a of one of the second guide members 52 mounted on one of the brackets 19 are spaced from and confront the pair of the second guide rollers 52a of the other one of the second guide members 52 mounted on the other one of the brackets 19. Consequently, the first and second guide rollers 51a and 52a are elastically deflected upon application of an external force thereto and are reduced in weight in comparison with those extending all the way between the brackets 19. The clearance between the pair of the second guide rollers 52a of each of the second guide members 52 is made smaller than that between the pair of the first guide rollers 51a of each of the first guide members 51. The front filter cloth portion 16-1 is guided to the wind-up roller 20 through the front first guide roller 51a and the front second guide roller 52a, while the rear filter cloth portion 16-2 is guided to the wind-up roller 20 through the rear first guide roller 51a and the rear second guide roller 52a.

By the above described arrangement of the filter press K2, since the pair of the filter cloth portions are bent inwardly toward each other by the first and second guide rollers so as to be squeezed, the filter residue can be smoothly separated from the filter cloth portions without any damage to the filter cloth portions. Furthermore, since the first and second guide rollers are elastically deflected upon downward travel of the pair of the filter cloth portions so as to absorb vibrations and waviness of the filter cloth portions, it becomes possible to bend the filter cloth portions inwardly toward each other stably and continuously, whereby the filter residue can be smoothly separated from the filter cloth portions.

Figure 15:
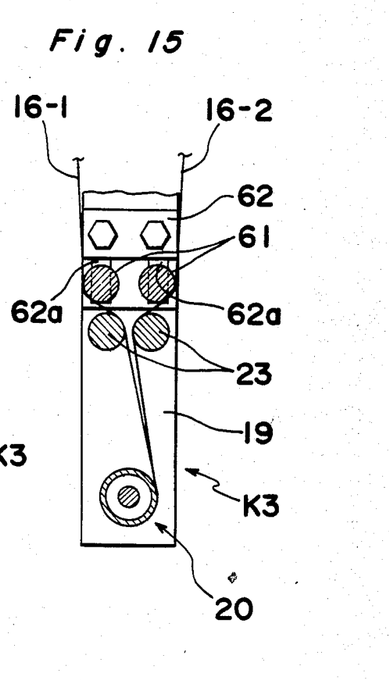
FIG. 15 is a view similar to FIG. 7, particularly showing a filter residue separating device employed in a filter press according to a third embodiment of the present invention.
Figure 16:
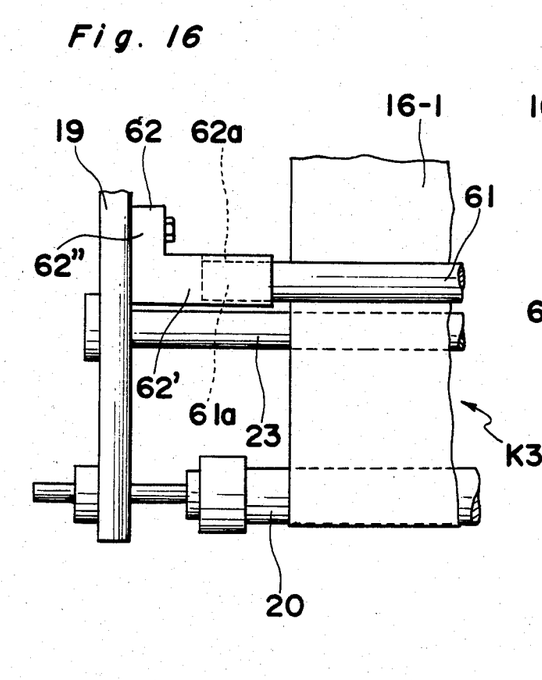
FIG. 16 is a fragmentary front elevational view of the filter residue separating device of FIG. 15.

Referring to FIGS. 15 and 16, there is shown a filter residue separating device employed in a filter press K3 according to a third embodiment of the present invention. The filter press K3 includes a pair of cylindrical guide members 61 and a pair of L-shaped holders 62 secured to the opposite brackets 19, respectively. Each of the holders 62 has a horizontal portion 62' having a pair of parallel rectangular slots 62a therein and an upright portion 62" secured to the corresponding one of the brackets 19 such that the slots 62a of one of the holders 62 confront the slots 62a of the other one of the holders 62, respectively, when the holders 62 are mounted on the brackets 19. Each of the guide members 61 has a pair of cutout flat portions 61a at opposite ends thereof with the flat portions 61a being received by corresponding ones of the slots 62a. When the pair of the guide members 61 are mounted on the pair of holders 62 by fitting each of the flat portions 61a of the guide members 61 into corresponding slots 62a of the holders 62, the guide members 61 are prevented from being rotated by engagement of each of the flat portions 61a with the slots 62a. The guide members 61 may be made of, for example, metal, plastic or the like. Since the remaining construction of the filter press K3 is similar to that of the filter K1, a detailed description thereof is omitted for the sake of brevity.

In the above described arrangement of the filter press K3, the guide members 61 are elastically deflected upon downward travel of the filter cloth portions so as to absorb vibrations and waviness of the filter cloth portions. Thus, it becomes possible to bend the filter cloth portions inwardly toward each other stably and continuously, whereby the filter residue can be smoothly separated from the filter cloth portions. Furthermore, the guide member is split into two portions and therefore has a lower weight in comparison with a guide member having a one-piece construction. Moreover, since the guide members 61 are mounted on the holders 61 merely by fitting the flat portions 61a into the slots 62a, replacement of guide members 61 having various diameters for dimensional adjustments can be performed remarkably easily. In addition, when elastic deflection of the guide members 61 is too large where guide members 61 made of material having low strength are employed, the large elastic deflection of the guide members 61 can be regulated to a proper level by securing a pair of leaf springs between the guide members 61.

Although the present invention has been described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A filter press including a plurality of filter plates, a pair of first and second filter cloths disposed at opposite faces of each of said filter plates, respectively, and a wind-up device for winding up the pair of said first and second filter cloths, said wind-up device being disposed below each of said filter plates, said filter press comprising:

an elongated guide member for guiding the pair of said first and second filter cloths which is disposed between each of said filter plates and said wind-up device so as to extend in a widthwise direction of each of said filter plates and has a pair of first and second curved guide surfaces formed on opposite side edges thereof, respectively such that said first and second curved guide surfaces confront said first and second filter cloths, respectively, with a width of said guide member being defined by said opposite side edges of said guide member; and a pair of first and second guide rollers which are disposed below and adjacent to said guide member so as to extend, in parallel with each other, in said widthwise direction of each of said filter plates;

said first and second guide rollers being spaced a predetermined clearance from each other, said predetermined clearance being smaller than said width of said guide member, the pair of said first and second filter cloths being guided downwardly from each of said filter plates and into contact with said first and second curved guide surfaces of said guide member, respectively and subsequently between the opposed inside portions of peripheries of said first and second guide rollers, respectively, and then to said wind-up device so as to be wound up by said wound-up device, whereby said first and second filter cloths are, respectively, bent inwardly toward each other at said first and second curved guide surfaces of said guide member.

2. A filter press as claimed in claim 1, wherein said guide member is of a solid one-piece construction.

3. A filter press as claimed in claim 1, wherein said guide member includes a guide member body, a pair of first and second members having said first and second curved guide surfaces, respectively and a pair of screws attaching the pair of said first and second members to opposite side faces of said guide member body.

4. A filter press as claimed in claim 3, wherein the pair of said first and second members are made of plastic.

5. A filter press as claimed in claim 1, wherein said guide member includes a guide member body, a member having said first and second curved guided surfaces formed at opposite sides thereof, respectively and a screw attaching said member to the bottom face of said guide member body.

6. A filter press as claimed in claim 5, wherein said member is made of plastic.

7. A filter press as claimed in claim 1, wherein said guide member is of a hollow elliptic cross section.

8. A filter press as claimed in claim 1, wherein said guide member includes a guide member body and a pair of first and second curved pieces having said first and second curved guide surfaces, respectively, the pair of said first and second curved pieces being secured to opposite side faces of said guide member body.

9. A filter press as claimed in claim 1, wherein said guide member includes a support member, a metal sheet member having said first and second curved guide surfaces formed at opposite side portions thereof, respectively and a bolt attaching said metal sheet member to said support member.

10. A filter press as claimed in claim 1, wherein said wind-up device is a wind-up roller.

11. A filter press as claimed in claim 1, wherein each of the pair of said first and second curved guide surfaces is coated with a film of a resin taken from the group consisting of urethane resin and polytetrafluoroethylene (PTFE) resin.

* * * * *